Jan. 8, 1929.

C. A. DONLEY ET AL 1,698,582

SPIKE MAKING MACHINE

Filed June 14, 1926   17 Sheets-Sheet 4

Inventor.—
Charles A. Donley,
William Etter.
by their Attorneys.—
Howson & Howson

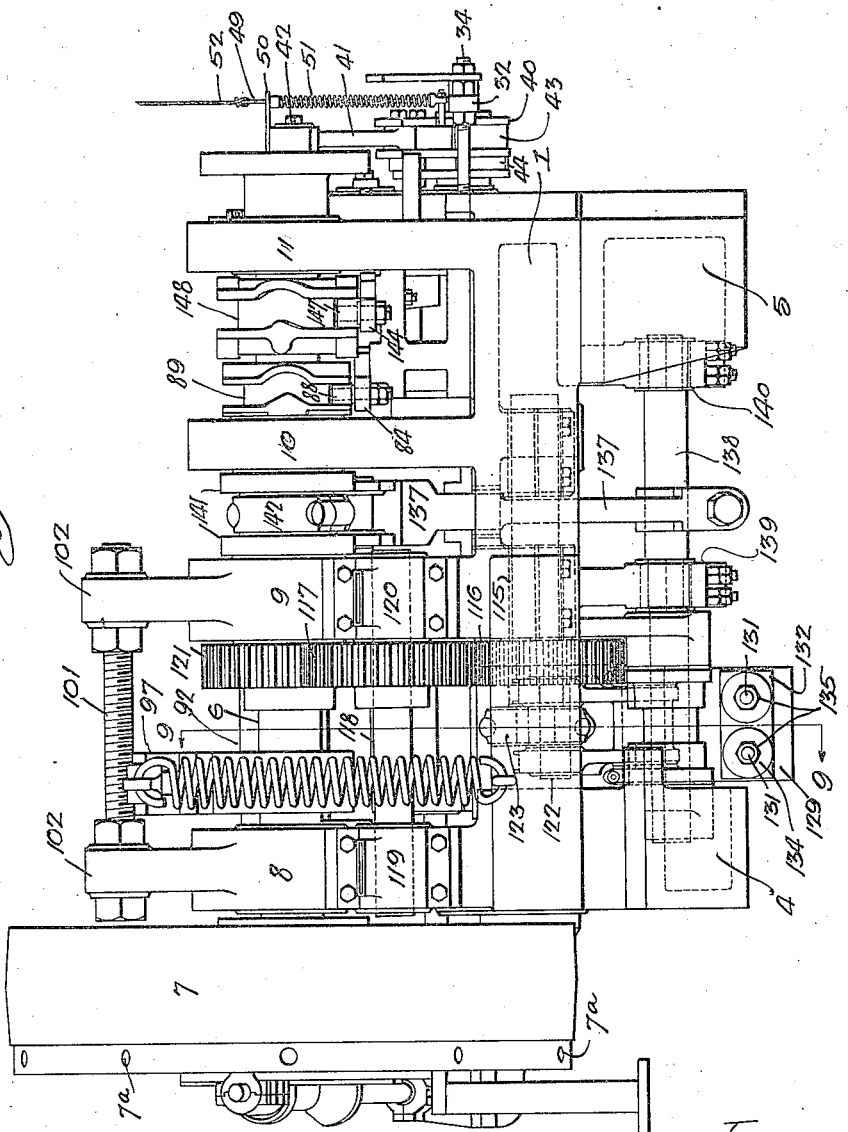

Jan. 8, 1929.

C. A. DONLEY ET AL

SPIKE MAKING MACHINE

Filed June 14, 1926

1,698,582

17 Sheets-Sheet 6

Inventors
Charles A. Donley,
William Etter
by their Attorneys
Howson & Howson

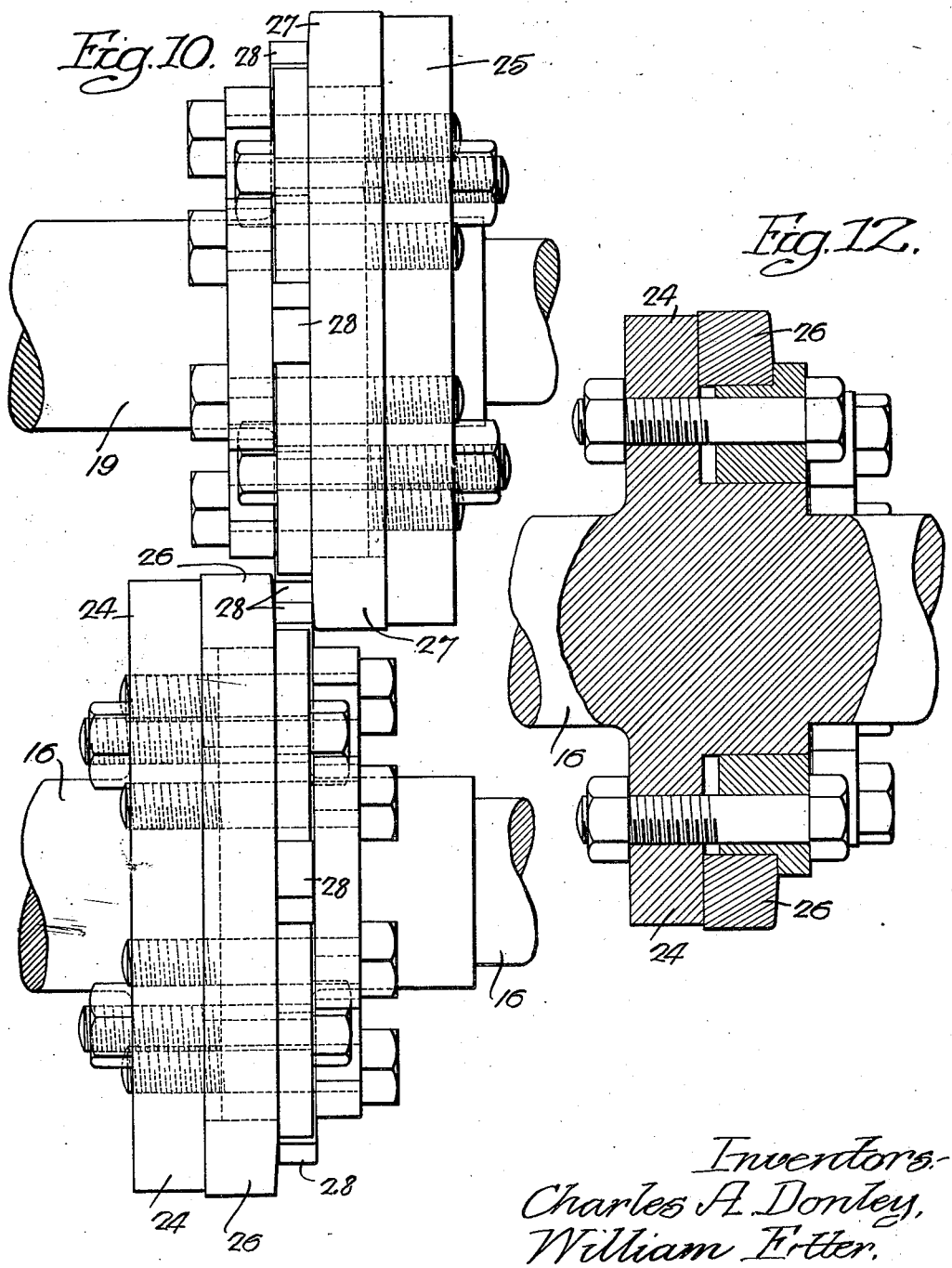

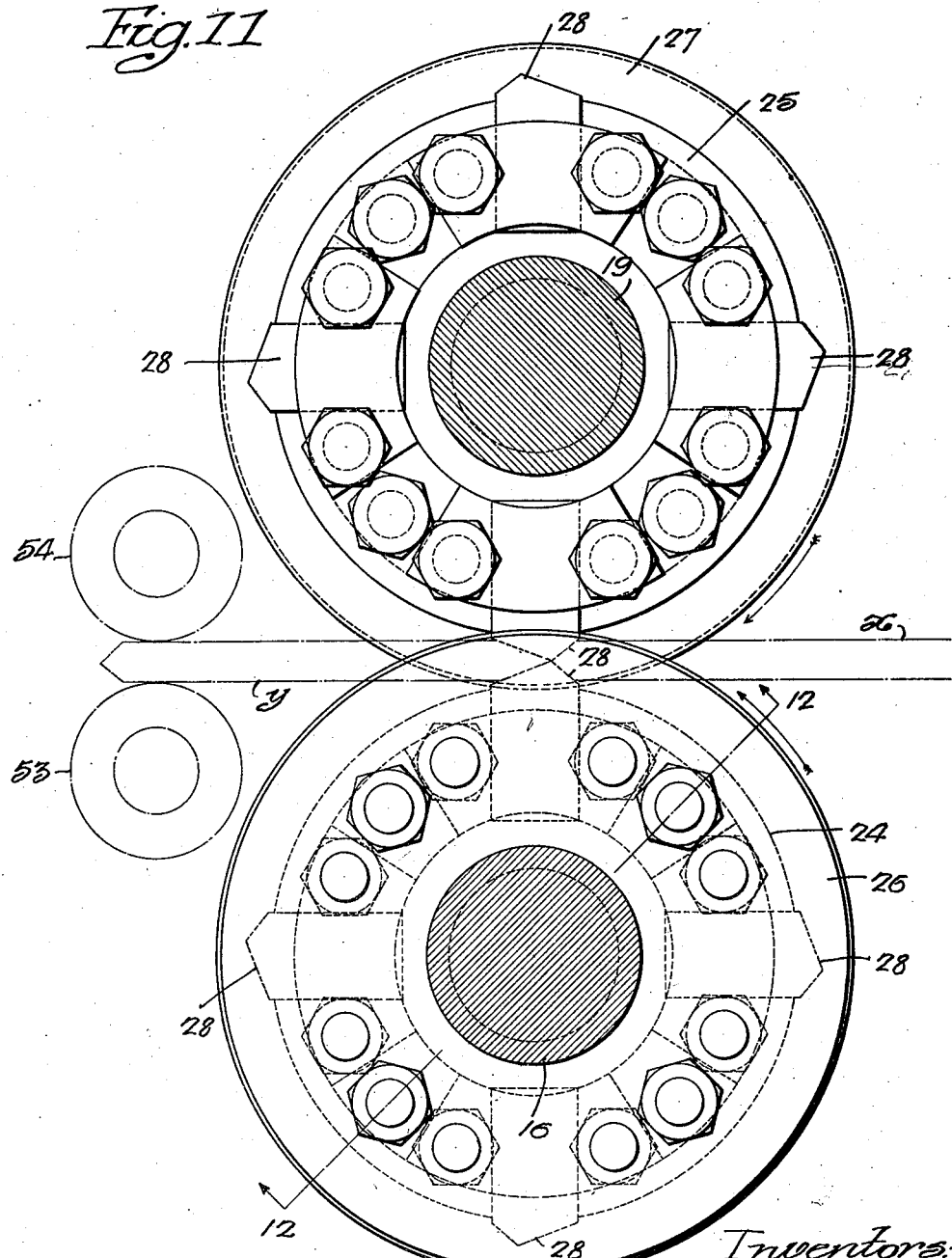

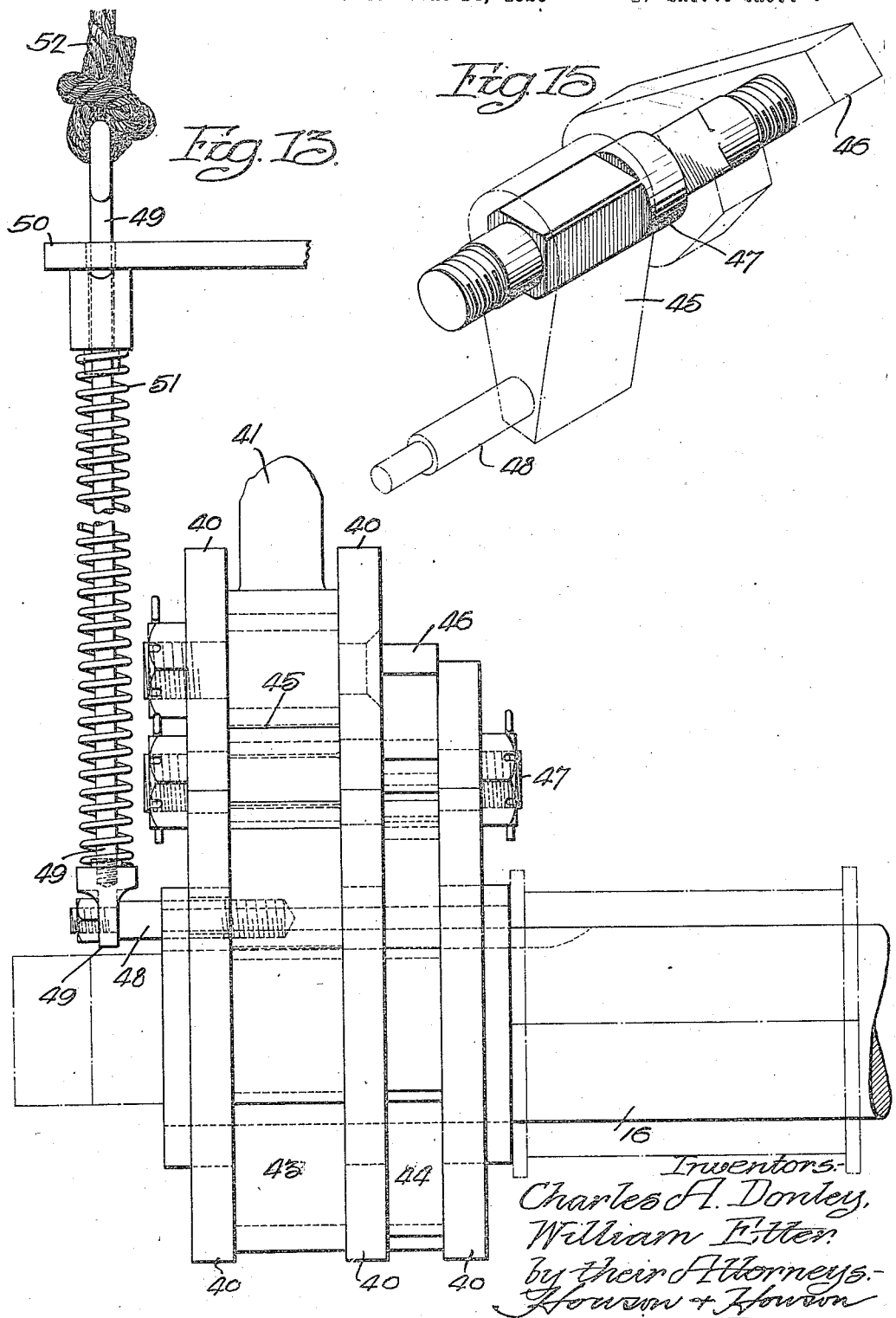

Jan. 8, 1929. 1,698,582
C. A. DONLEY ET AL
SPIKE MAKING MACHINE
Filed June 14, 1926 17 Sheets-Sheet 10

Inventors
Charles A. Donley,
William Etter.
by their Attorneys

Jan. 8, 1929.  1,698,582

C. A. DONLEY ET AL
SPIKE MAKING MACHINE
Filed June 14, 1926   17 Sheets-Sheet 17

Inventors.—
Charles A. Donley,
William Etter.
by their Attorneys.
Howson & Howson Patented Jan. 8, 1929.

1,698,582

UNITED STATES PATENT OFFICE.

CHARLES A. DONLEY AND WILLIAM ETTER, OF LEBANON, PENNSYLVANIA, ASSIGNORS TO LEBANON IRON COMPANY, OF LEBANON, PENNSYLVANIA, A CORPORATION OF PENNSYLVANIA.

SPIKE-MAKING MACHINE.

Application filed June 14, 1926. Serial No. 115,889.

The principal object of our invention is to provide an automatic spike making machine comprising various improved features and various advantageous arrangements of elements, whereby the spike forming operations are successively performed in a rapid and efficient manner.

One of the specific objects of the invention is to provide mechanism by which any short scrap end of a length of stock will be efficiently ejected from the machine, to avoid its passing into the receptacle for the finished spikes.

Another specific object of the invention is to provide an improved feeding mechanism for transferring the spike blanks from the cutting off and pointing mechanism to the gripping and head forming mechanism.

Another object of the invention is to provide, in combination with the transfer mechanism, an improved stop mechanism for correctly positioning a spike blank in the gripping mechanism for subsequent formation of the spike head.

Another object of the invention is to provide improved means for operating the gripping dies, this mechanism including devices by which injury to the machine elements is prevented, in event of obstructions being encountered by the dies.

Still another object of the invention is to provide improved mechanism for successively ejecting the finished spikes from the machine.

Figure 1:
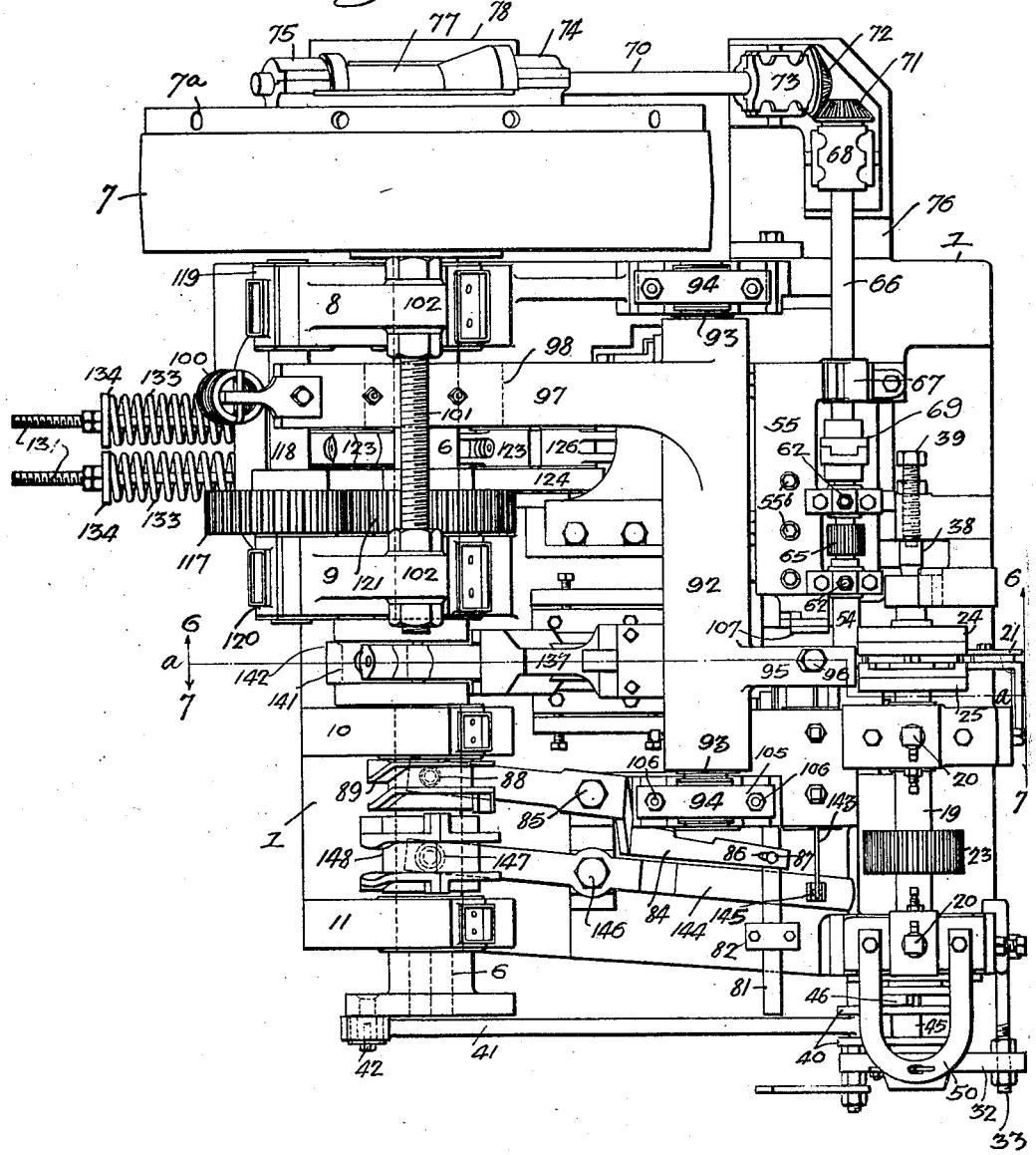
Figure 2:
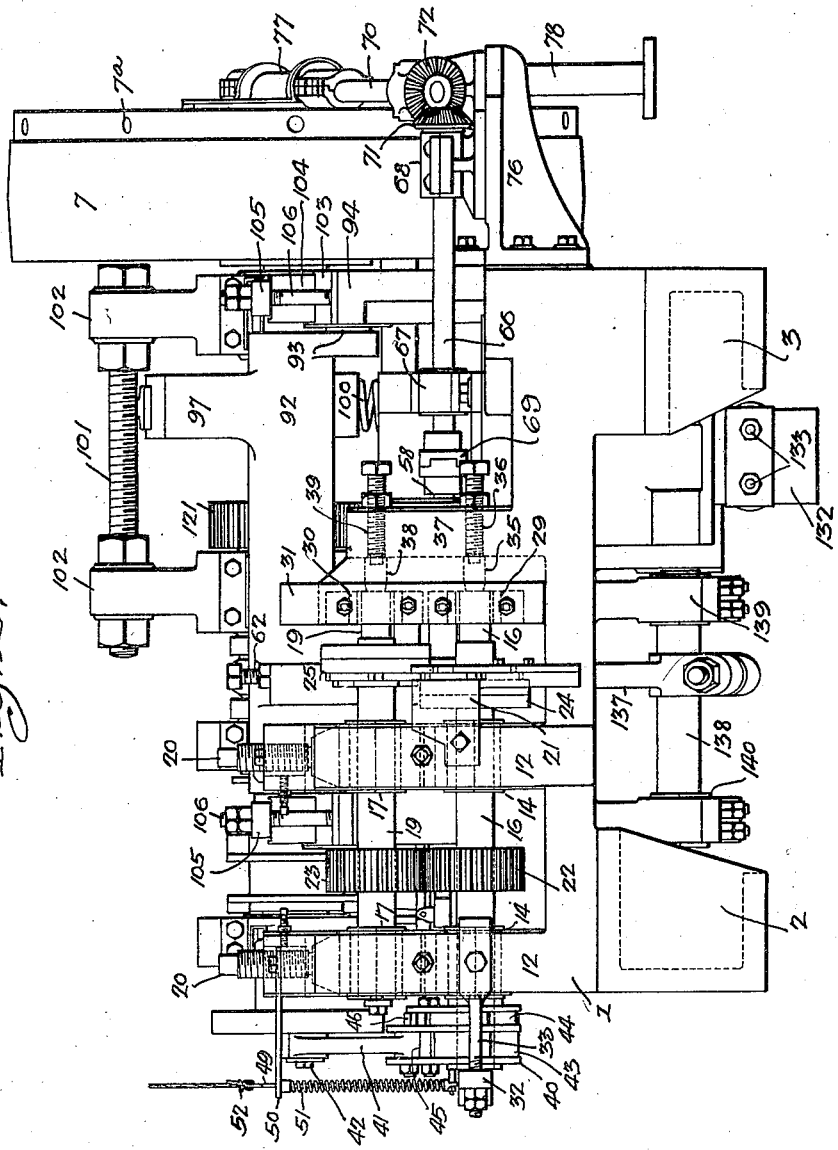
Figure 3:
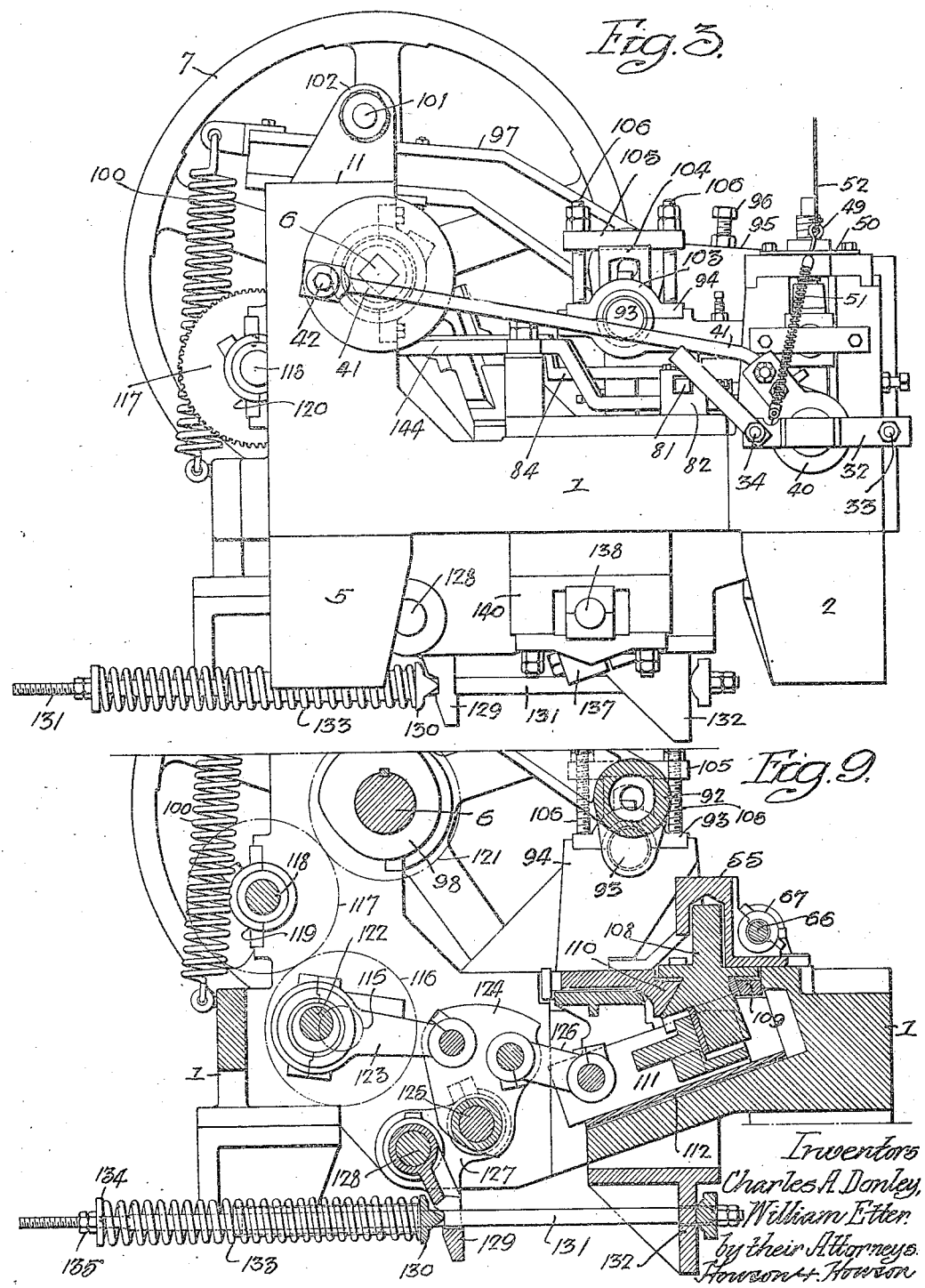
Figure 4:
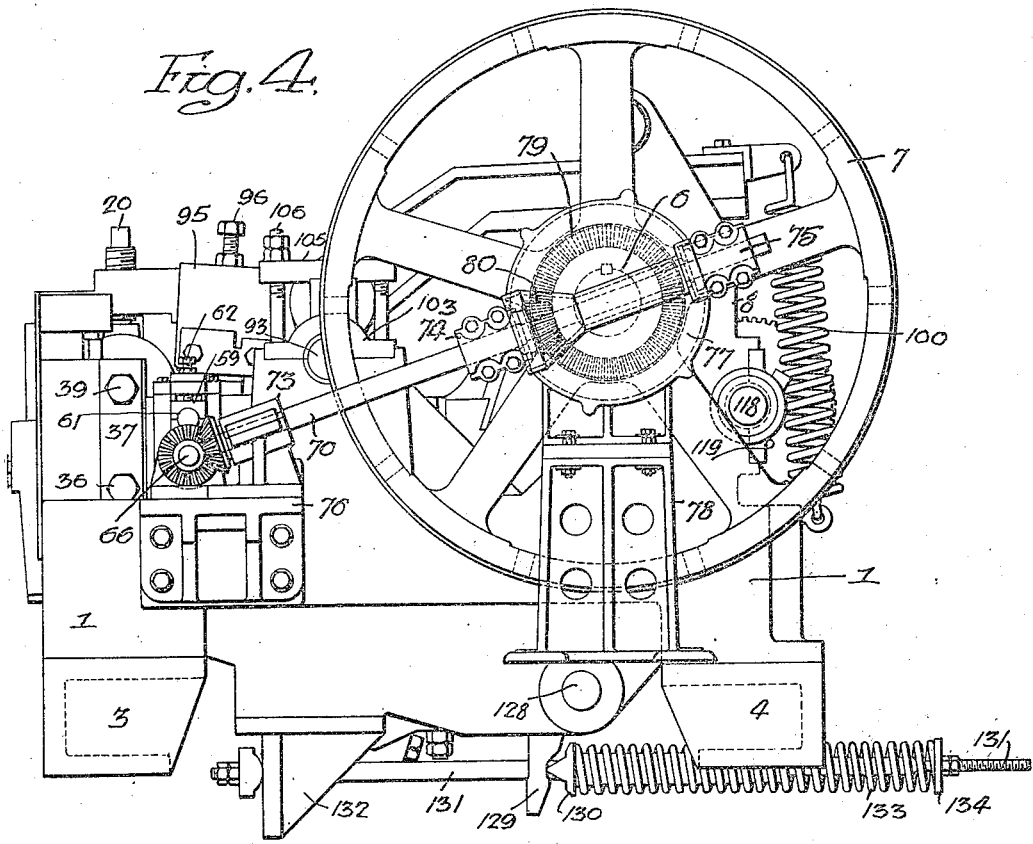
Figure 8:
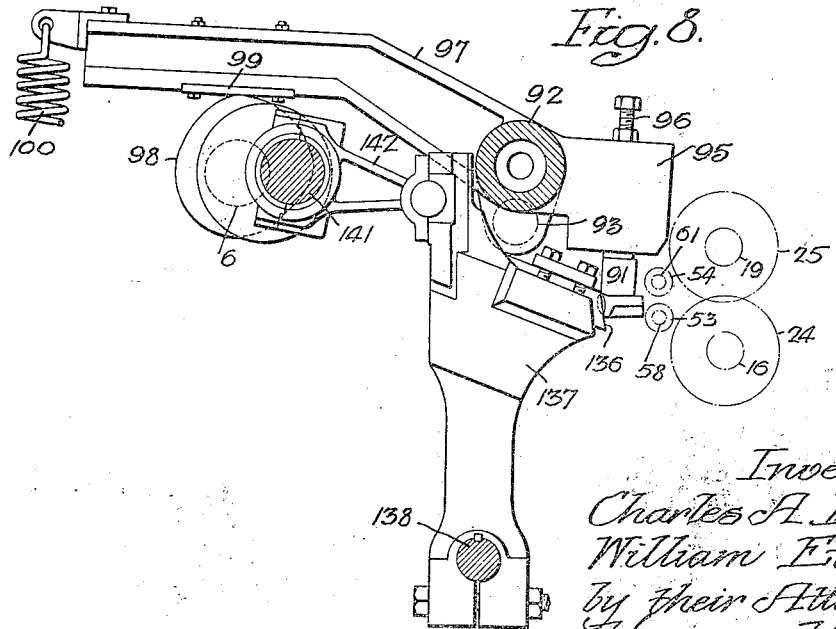
Figure 7:
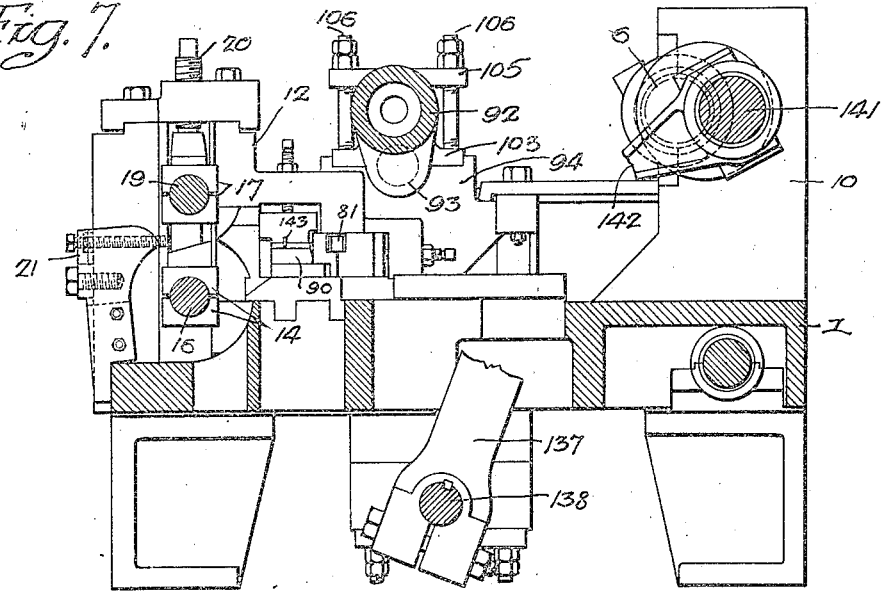
Figure 6:
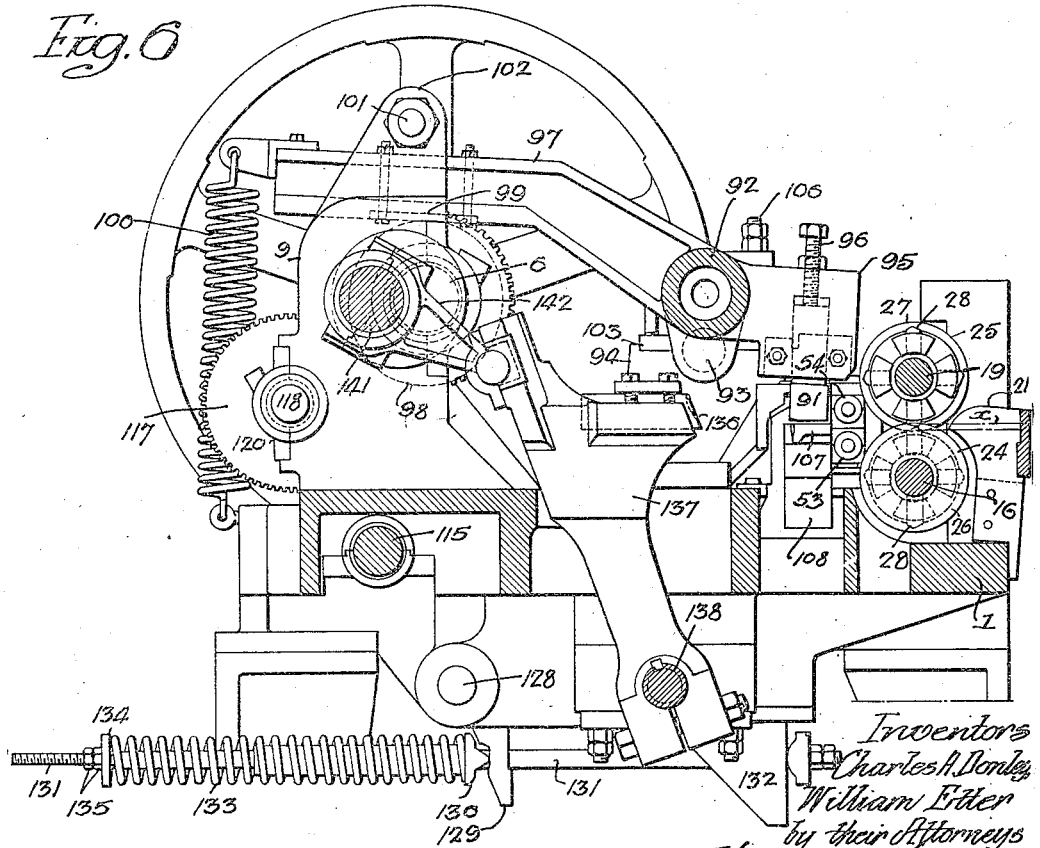
Figure 14:
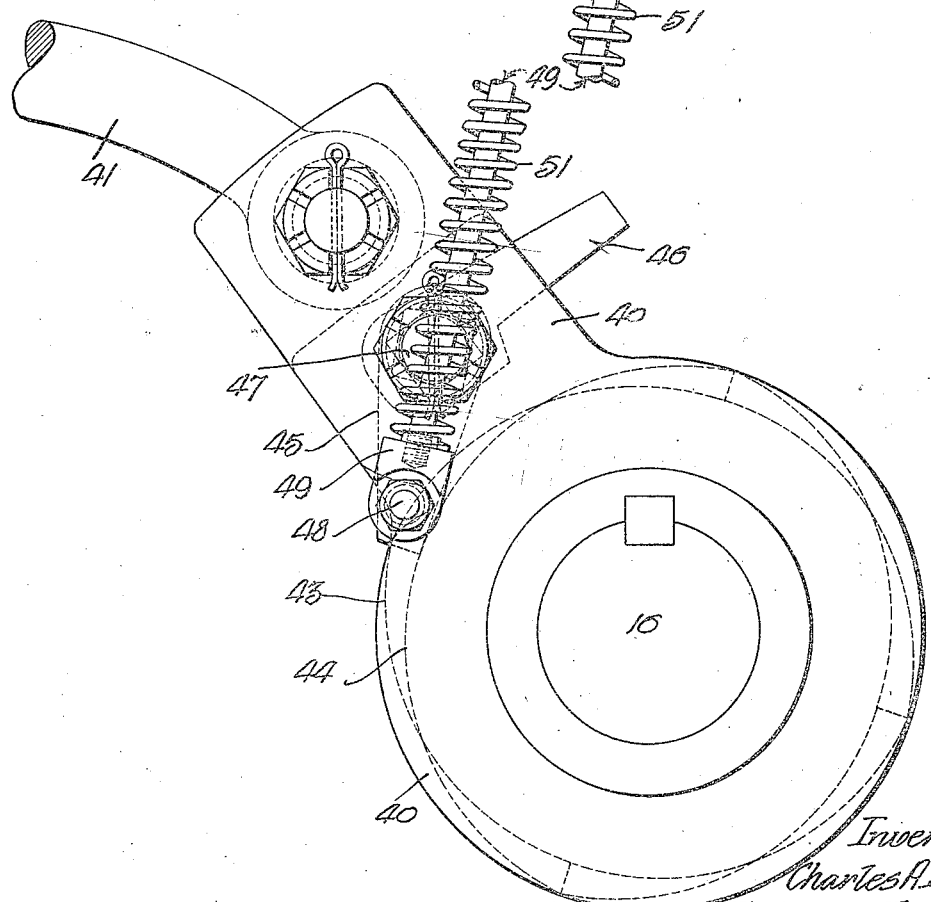
Figure 16:
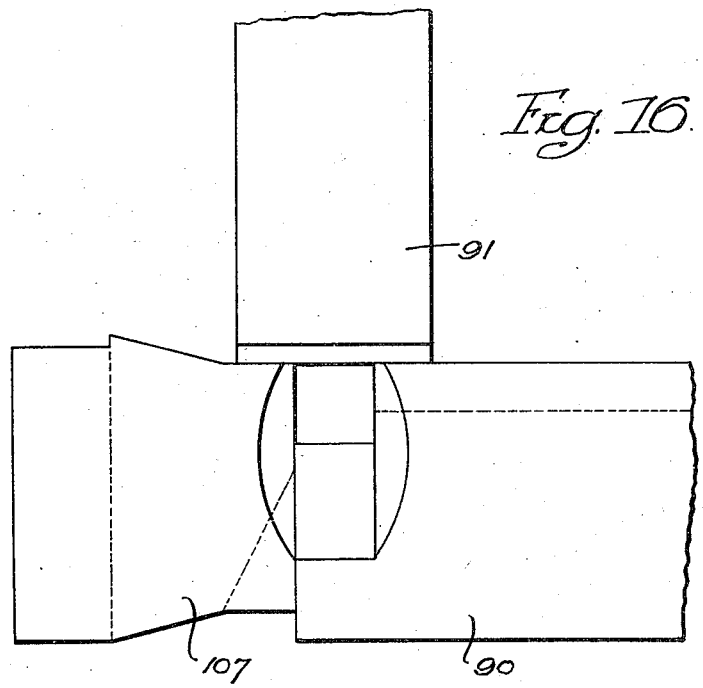
Figure 17:
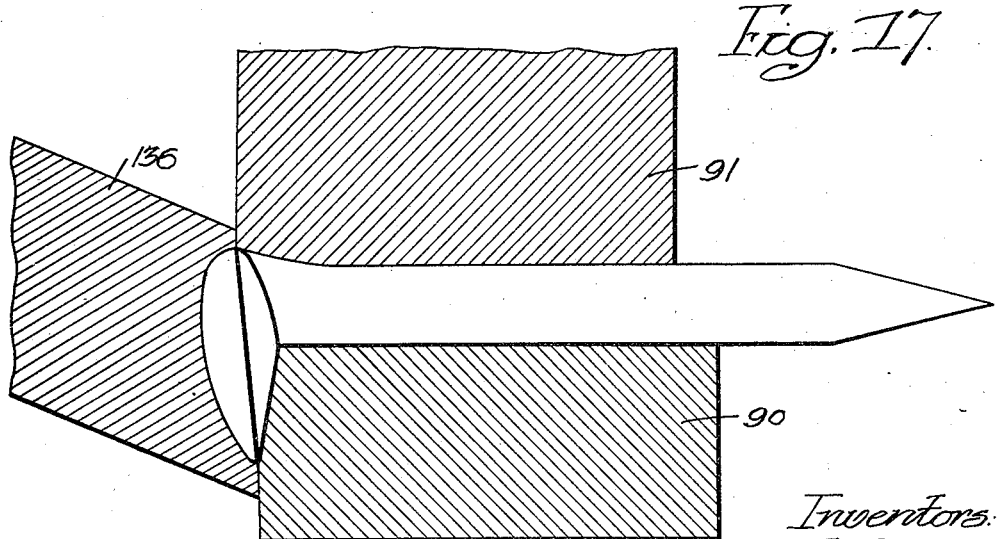
Figure 18:
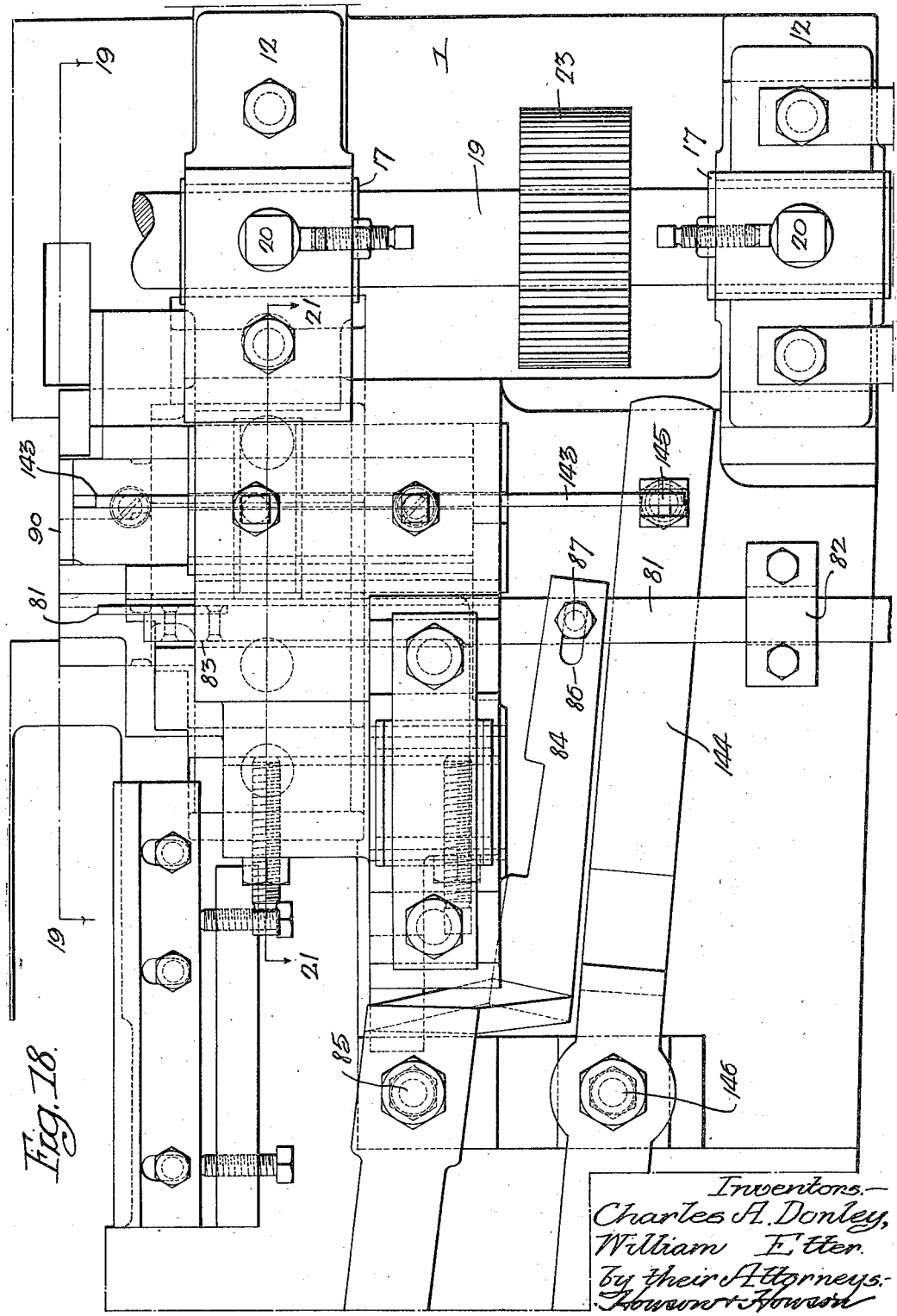
Figure 19:
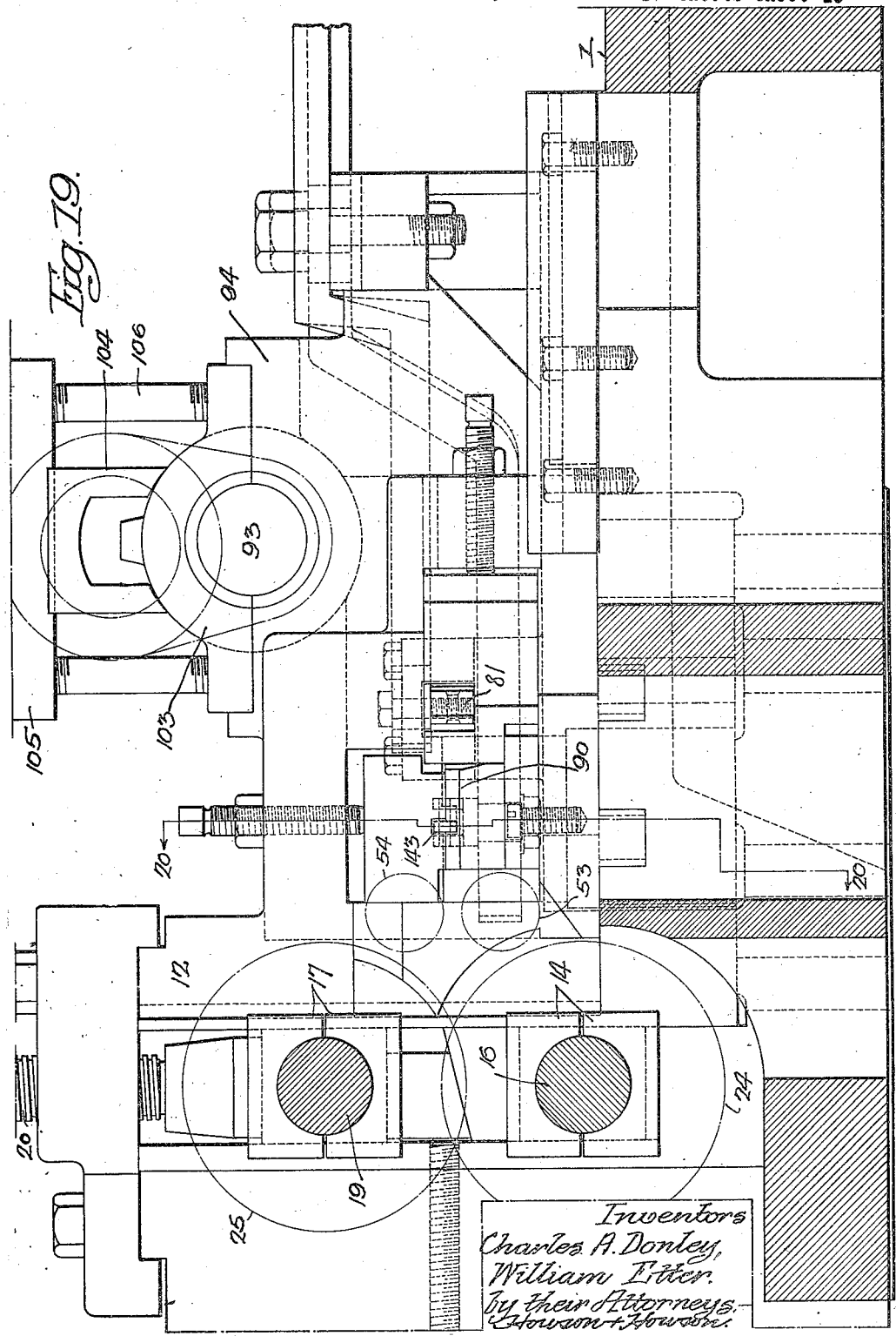
Figure 20:
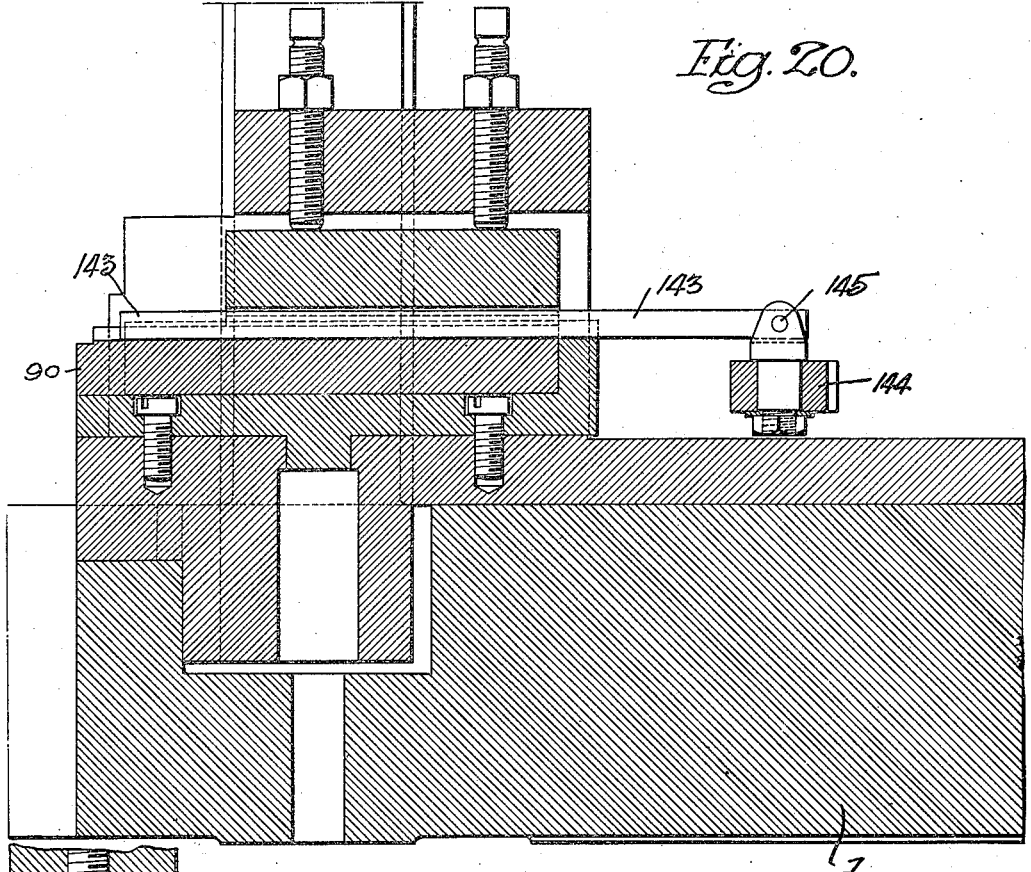
Figure 21:
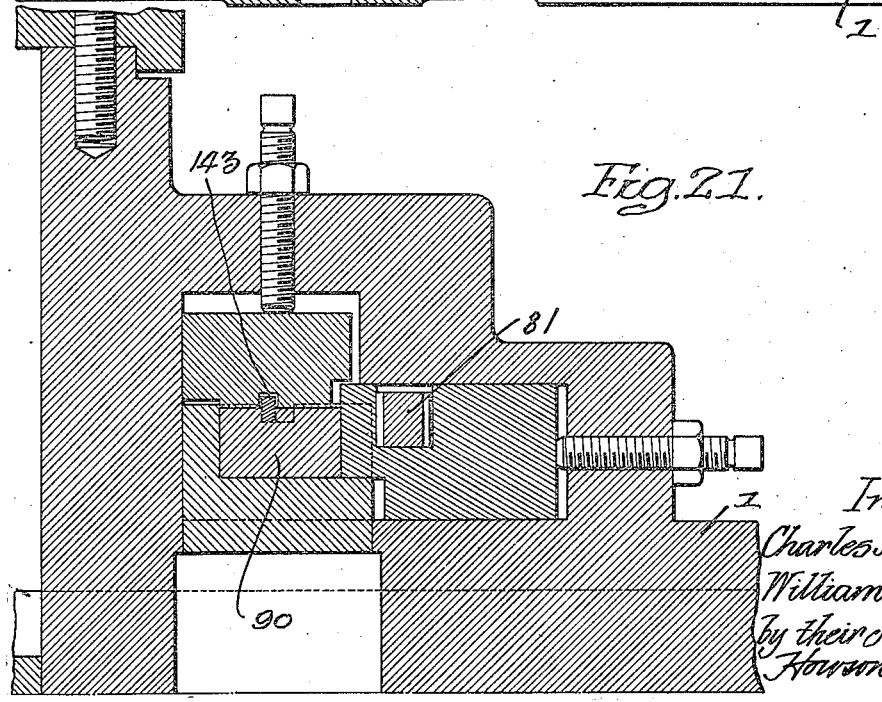
Figure 22:
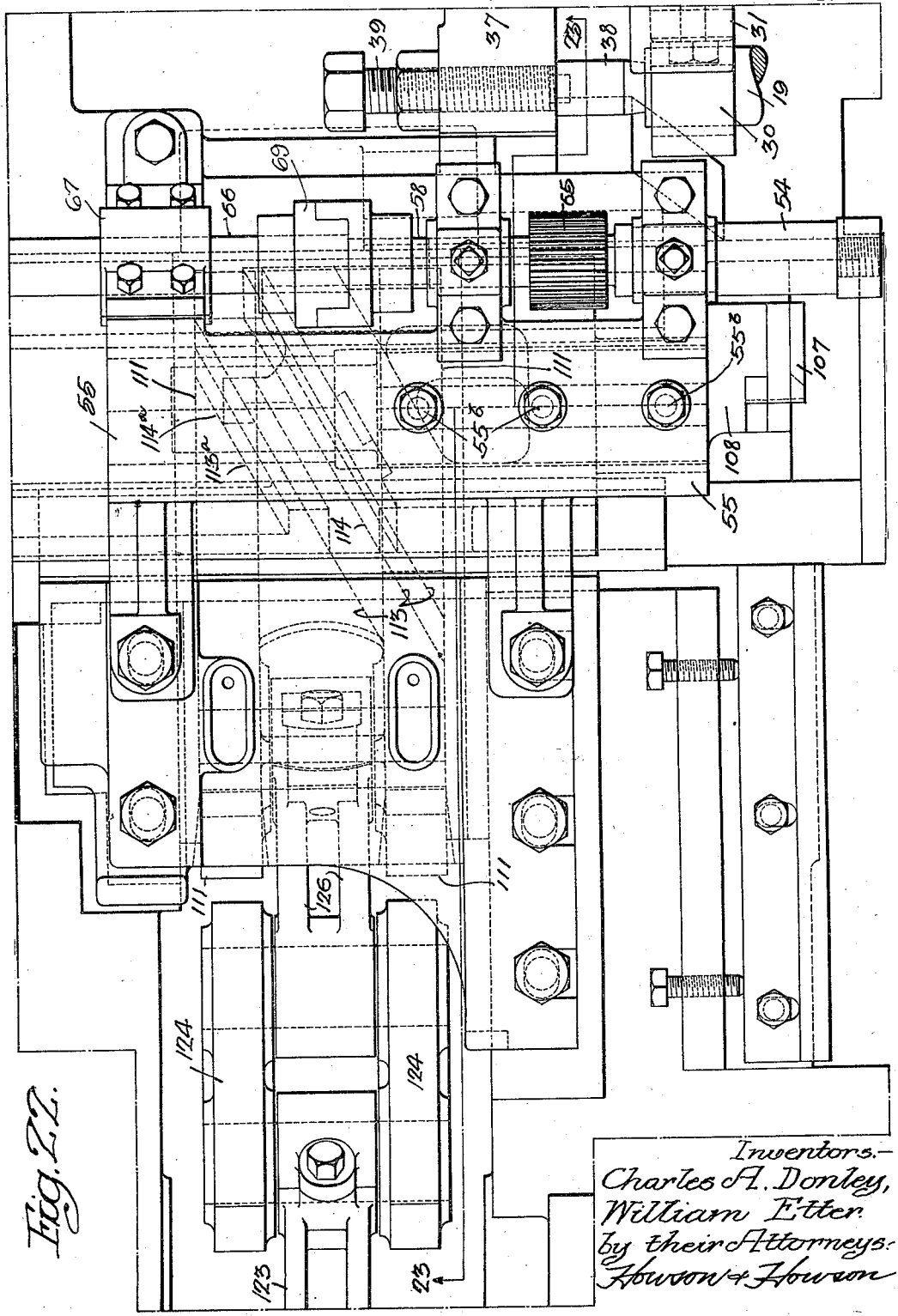
Figure 23:
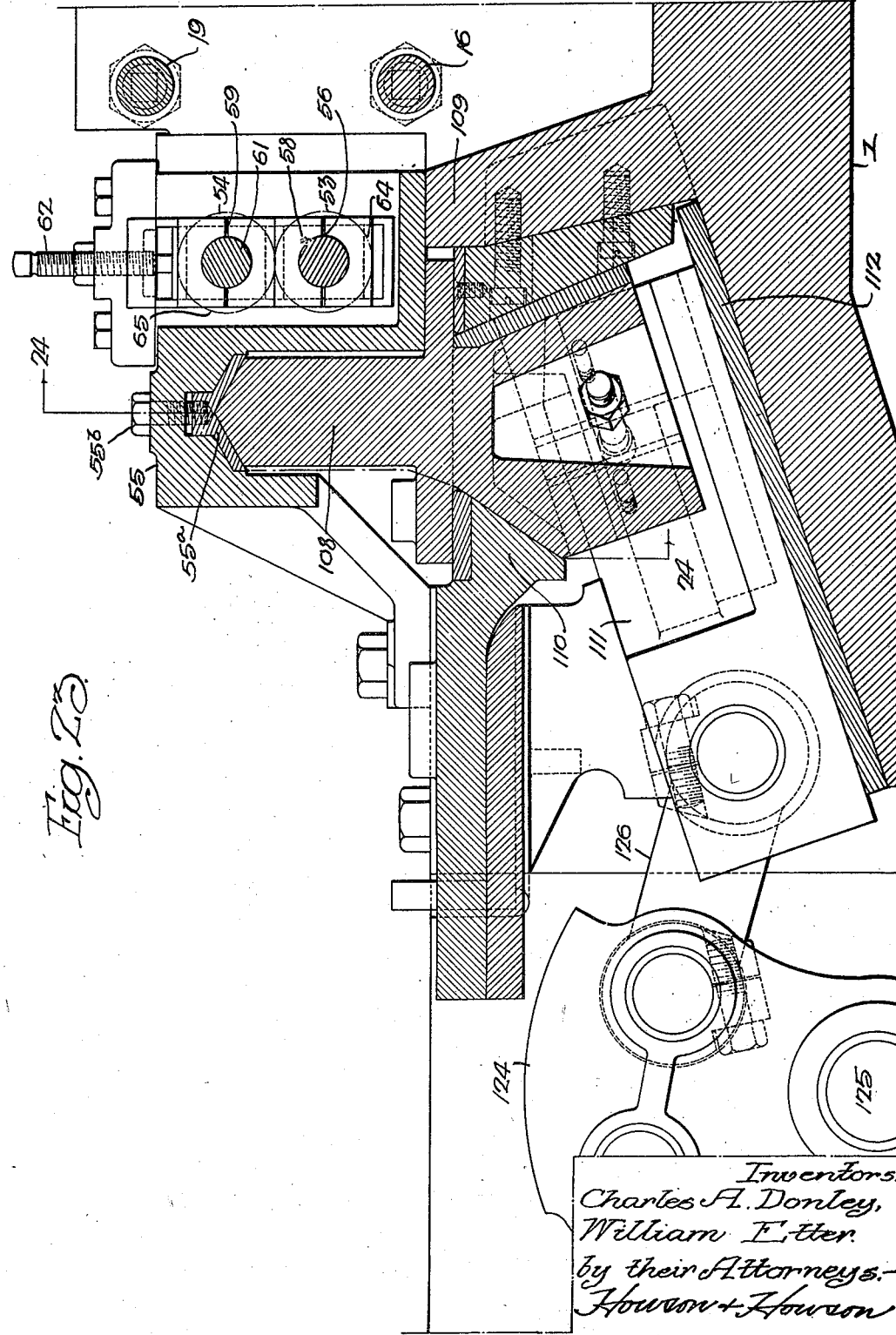
Figure 24:
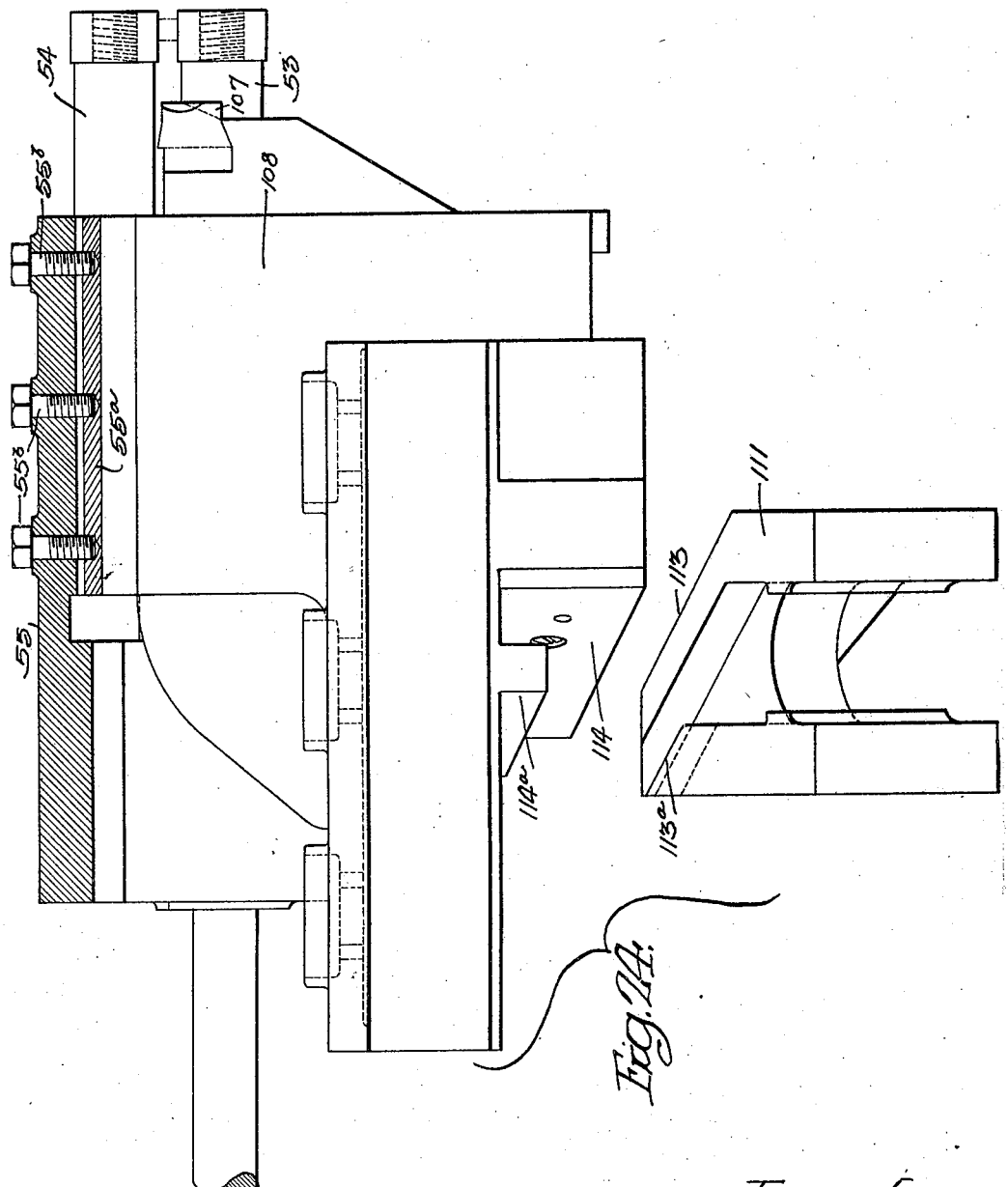

Various other objects and advantages of the invention will be apparent upon reference to the following specification and claims and the accompanying drawings of which:

Fig. 1 is a plan view;
Fig. 2 is a front elevation;
Fig. 3 is a left end elevation;
Fig. 4 is a right end elevation;
Fig. 5 is a rear elevation;
Figs. 6 and 7 are longitudinal sectional elevations taken along the line a, a of Fig. 1, and viewed in the direction of the arrows 6—6 and 7—7, respectively;
Fig. 8 is a view similar to Fig. 6, but showing certain of the elements of the machine in their operative positions relative to each other;
Fig. 9 is a transverse sectional elevation taken along the line 9—9 of Fig. 5;
Fig. 10 is a front elevation, drawn on an enlarged scale of the combination feeding and cutting rolls;
Fig. 11 is a side elevation of the elements shown in Fig. 10;
Fig. 12 is a sectional elevation of the elements shown in Figs. 10 and 11 taken along the line 12—12, Fig. 11;
Fig. 13 is an enlarged fragmentary front view showing the driving ratchet mechanism for the feeding and cutting rolls.
Fig. 14 is an enlarged fragmentary left side view of the ratchet mechanism.
Fig. 15 is a perspective view of the pawl mechanism illustrated in Figs. 13 and 14;
Fig. 16 is a detailed end elevation of the fixed bottom and side, the movable side die, and the movable top die, shown respectively in their relative positions of co-operation;
Fig. 17 is a longitudinal sectional elevation showing the fixed bottom, the movable top and the header dies;
Fig. 18 is an enlarged plan view of the fixed side and bottom die, illustrating the movable stock stop and the ejector, co-operatively associated therewith;
Fig. 19 is an enlarged transverse sectional elevation taken along the line 19—19, Fig. 18;
Fig. 20 is a sectional elevation taken along the line 20—20, Fig. 19;
Fig. 21 is a sectional elevation taken along the line 21—21, Fig. 18;
Fig. 22 is an enlarged plan view of the movable side die and its co-operating elements;
Fig. 23 is a sectional elevation taken along the line 23—23, Fig. 22; and
Fig. 24 is a sectional elevation taken along the line 24—24 of Fig. 23, showing one element as being detached from the other sufficiently to clearly illustrate the co-operable construction of the elements.

The machine in its preferred form comprises the following essential and principal mechanisms:

A pair of co-operating combination feeding and cutting off rolls which serve to engage a bar of preheated metal, from which the spikes are to be formed, and to feed a predetermined portion of the bar into the machine for the formation of a single spike. These rolls function to feed the desired amount of the bar into the machine, to cut off such a predetermined length thereof and to form a point on one end of the severed section.

A pair of transverse rolls for engaging the severed and pointed section of the bar as soon as cut off, and advancing it to the position wherein a head is to be formed thereon at the end opposite the point thereof.

A stop for limiting the extent of movement of and correctly positioning the severed section of the bar in a manner to be headed, this stop being adapted to move out of its operative position immediately upon completing its definite function.

A set of jaws adapted to grip the severed section of the bar at its top and bottom and at both of its sides, to firmly hold it while the heading operation is being effected.

A head forming die adapted to engage the blank end of the heated bar section and to co-operate with the holding jaws to form the desired head.

An ejector adapted to remove the completed spike after it has been released from and by the jaws.

The unitary mechanisms above mentioned are compactly carried on and by a main bed 1, which is supported upon front legs 2 and 3 and upon rear legs 4 and 5. Rotatably supported in an elevated position above the rear of the bed is a main power shaft 6 which is adapted to be driven from any desired source of power, by means of a belt passing around the fly wheel 7. Preferably the fly wheel is provided with a series of holes 7ª adapted to receive a bar by which the machine may be manually turned when making adjustments to the dies or other elements of the machine. Main bearings 8, 9, 10 and 11 are provided for the shaft 6 which is adapted to supply the necessary motive power to, and for the operation of, the operating elements of the machine, each of which will be hereinafter described in detail in their successive order of operation as above noted.

The combination feeding, cutting off and pointing mechanism is shown clearly in Figs. 1, 2, 10, 11, 12, 13, 14 and 15. The main bed plate 1 is provided, adjacent its front edge, with two bearing members 12, 12 projecting upward therefrom. These bearing members are provided respectively with fixed bearings 14, 14 for a transverse horizontal shaft 16, and with vertically adjustable bearings 17, 17 for a second transverse horizontal shaft 19. Screws 20, 20 are provided for vertically adjusting the two bearings 17, 17. Intermeshing gears 22 and 23 are mounted respectively on the shafts 16 and 19, these gears serving to cause the uniform rotation of the two shafts in opposite directions. The range of adjustment of the upper bearings 17, 17 is relatively slight so that the gears remain in mesh throughout the entire range.

Carried by the two shafts 16 and 19 are feed rollers 24 and 25, these rollers being of equal diameters and related in a manner to grip a bar of stock between their peripheries. The bar to be operated upon, being previously heated is introduced into the machine between the rollers 24 and 25. A guide 21 is preferably provided for supporting the bar in advance of the rollers. The cross-sectional dimensions of the bar are the same as those of the body of each spike to be made. The two rollers 24 and 25 are flanged at opposite sides, the roller 24 having a flange 26 at the left hand side and the roller 25 having a flange 27 at the right hand side. These flanges are so spaced as to engage the sides of the bar and assist in feeding it. Carried by the two feed rollers 24 and 25 are co-operating pairs of combined cutting off and pointing teeth 28, 28, the teeth of each pair being so located as to come opposite each other, as clearly shown in Fig. 11. The number of pairs of teeth 28, 28 can be varied, but for purposes of illustration I have shown four pairs of such teeth. It will be understood that when the feed rolls are rotated the teeth 28 of each bar are forced into the heated stock, cutting it off and pointing it at the same time. The two flanges 26 and 27, engaging the sides of the bar, preventing any lateral distortion thereof and maintaining the uniform width of the spike at the point thereof, during the cutting off and pointing operation.

Preferably the shafts 16 and 19 are provided with supplemental outboard bearings 29 and 30 at the right of the feed rollers, as shown in Fig. 2. A bearing supporting member 31 projects upward from the bed and the bearings 29 and 30 are bolted to the rear face of this member. Slotted bolt holes are provided in the upper bearing 30 to permit the vertical adjustment thereof in accordance with the vertical adjustment of the bearings 17, 17.

The lower shaft 16 is provided with thrust members at opposite sides thereof. At the outer end of the shaft 16 and as clearly shown in Figs. 1 and 3, there is provided a transverse bar 32 carried by studs 33 and 34 projecting laterally from the bearing member 12. The bar 32 engages the end of the shaft, and it is adjustable by means of nuts on the said studs. The inner end of the shaft 16 is engaged by a plug 35 which is adjustable by means of a stud 36 extending through an upright member 37 projecting upward from the bed 1. The inner end of the shaft 19 is engaged by a plug 38 similar to the plug 35, and similarly adjustable by means of a stud 39 also extending through the upright member 37.

By vertically adjusting the shaft 19 with its feed roll, and by laterally adjusting the feed rolls by means of the thrust bearings which have been described, the machine can be adapted within certain narrow limits for operating upon bars of different sizes.

The shafts 16 and 19 are adapted to be rotated intermittently and when there are four pairs of cutting off and pointing teeth, as shown, the feed rolls are given a quarter revolution at each actuation thereof. For thus intermittently rotating the rolls a ratchet mechanism is provided on one of them, and as illustrated this ratchet mechanism is on the lower shaft 16.

The ratchet mechanism is shown most clearly in Figs. 1, 3, 13 and 14. Loosely mounted on the shaft 16 is a pawl carrier 40 adapted to be oscillated by means of a link 41, pivotally connected thereto at its forward end, its rear end being connected with a crank pin 42 carried by the main shaft 6. Keyed or otherwise secured to the shaft 16 adjacent the pawl carrier 40 are two ratchet wheels 43 and 44. These wheels are similar but are mounted with their teeth facing in opposite directions. The number of teeth in each ratchet wheel is the same as the number of pairs of cutting off and pointing teeth 28, 28. In the present case, there are four pairs of teeth 28, 28. In the present case, there are four pairs of teeth 28, 28, and accordingly each ratchet wheel has four teeth.

Mounted on the pawl carrier are two pawls 45 and 46 adapted respectively to engage the ratchet wheels 43 and 44. These pawls are carried by a common pivot shaft 47, and means is provided which normally serves to hold the pawl 45 in engagement with the ratchet wheel 43 and the pawl 46 out of engagement with the ratchet wheel 44. It will be noted that when the ratchet wheel 43 is engaged by the pawl 45 the action is to rotate the two feed rollers in the direction to feed the bar of stock inward, and to cut off and point a blank for a spike.

Preferably the means for holding the pawl 45 in operative position comprises a pin 48 on the said pawl projecting through an eye at the lower end of a pawl link 49. The upper end of the link 49 is guided by a U-shaped member 50, secured to the bearing member 12 and a compression coil spring 51 is interposed between the member 50 and the eye at the lower end of the link. In order that the pawl 45 may be disengaged from its ratchet wheel, and the pawl 46 engaged with its ratchet wheel a rope 52 is provided which is connected with the upper end of the link 49, and which extends to a location within convenient range of the operator. It will be seen that the operator by pulling on the rope 52 can render the pawl 45 inoperative, and at the same time render the pawl 46 operative to rotate the shafts in the opposite direction. This reversed rotation of the shafts and of the feed rolls is desirable when the end of a bar of stock is reached. When the operator observes that the remaining end of the bar is not of sufficient length to form another spike, he can reverse the feed rolls to throw out this short end, and thus prevent it from entering the machine where it might cause trouble and where it would be mixed with the finished spikes.

As the desired length $y$ of the stock bar $x$ is cut off and pointed, the opposite end of such severed section is engaged by a pair of transfer rollers 53 and 54 which occupy a position immediately adjacent and at the rear of the feed rollers 24 and 25, the function thereof, as above stated, being to engage the spike blank as soon as it is cut off and pointed, and to transfer it rearward into position to be engaged by the holding jaws. These feed rollers and the mechanism for operating them are most clearly shown in Figs. 1, 2, 4 and 6.

Carried by the bed 1 is a frame member 55 having a pair of fixed bearings 56, 56 therein for a horizontal shaft 58 and a pair of vertically adjustable bearings 59, 59 therein for a horizontal shaft 61. The two bearings 59, 59 are each vertically adjustable by means of a screw 62. The before-mentioned transfer rollers 53 and 54 are mounted on the shafts 58 and 61 respectively, and these two shafts are operatively connected by means of intermeshing gears 64 and 65 mounted respectively thereon. The range of adjustment of the upper shaft 61 is not great enough to interfere with the proper meshing of the two gears. By means of this adjustment the upper transfer roller 54 can be adjusted in accordance with adjustments of upper feed roller 25.

A drive shaft 66 is provided in alignment with the shaft 58, this shaft being mounted in bearings 67 and 68, and being connected with the shaft 58 by means of a coupling 69. The shaft 66 is driven by means of a shaft 70, the two shafts being connected by beveled gears 71 and 72. The shaft 70 is inclined and is mounted in bearings 73, 74 and 75 at the right hand end of the machine. The bearing 73 is carried by a bracket 76 which also carries the bearings 68. The two bearings 74 and 75 are shown as supported on a housing 77 which in turn is carried by a bracket 78 mounted independently of the main bed 1 of the machine. A bevel gear 79 is secured to the main shaft 6 within the housing 77, and this meshes with a bevel gear 80 mounted on the shaft 70, and also located within the housing 77. It will be seen that with the mechanism described the two transfer rollers 53 and 54 are continuously rotated when the main shaft 6 is rotated.

For limiting the movement of the blanks by the transfer rollers 53 and 54 a stop is provided which engages the blunt end of each blank as it is transferred rearward. This stop and the actuating mechanism therefor are most clearly shown in Figs. 1, 18 and 19. The stop comprises a bar 81 which is longitudinally movable on the bed within guides 82 and 83. For moving the stop bar 81 a lever 84 is provided which is pivoted between its ends at 85. The front end of the lever is provided with a slot 86 through which projects a pin 87 carried by the stop bar 81. Adjacent the rear end of the lever 84 is a bearing roller 88 which projects into the groove of a cam 89 on the main shaft 6. The cam groove is so formed that the stop bar is moved toward the right and into the path of the advancing blank just before the blank is moved rearward by the transfer rollers 53 and 54. The stop 81 limits the rearward movement of the blank, and it is then engaged by the gripping jaws to be presently described in detail. As soon as the blank has been engaged by the gripping jaws the stop bar 81 is moved toward the left and out of the way of the heading die which will also be described in detail hereinafter.

As soon as the blank has been moved rearward by the transfer rollers 53 and 54 to the position determined by the stop 81 it is engaged by combined gripping jaws and forming dies which hold it and maintain its proper shape and proportions during the heading operation. The jaw mechanism is shown most clearly in Figs. 1, 6, 7 and 16 to 22 inclusive. When the blank is moved rearward as described it immediately comes into engagement with a stationary die 90 which engages the blank at the bottom thereof and at the left side. The position and construction of this die are shown in detail in Figs. 16 and 17, and it will be observed that the die is secured in fixed position on the bed.

A top gripping mechanism is provided for engaging the top surface of the blank in opposition to the lower part of the fixed die which engages the bottom of the blank. This top gripping die is represented by 91, and is shown most clearly in Figs. 6, 16 and 17. For supporting and operating the die 91, there is provided a lever having a main longitudinally extending hub 92. The hub 92 terminates in downward offset trunnions 93, 93 which are supported in bearings 94, 94. The lever has a forward extending arm 95 in which the die 91 is clamped, the die being vertically adjustable in the arm by means of a screw 96. The hub 92 is also provided with a rearward extending arm 97 which is adapted to be engaged by a cam 98 carried by the main shaft 6 between the two bearings 8 and 9. Preferably the arm 97 is provided with a wearing plate 99 with which the cam 98 directly engages. Preferably also there is provided a spring 100 which engages the arm 97 to hold it in contact with the cam 98 and to prevent any chattering of the elements. For the purpose of reinforcing the supports for the two bearings 8 and 9, there is provided a tie rod 101 which extends longitudinally between ears 102, 102 formed on the bearing members 8 and 9.

The cam 98 is so positioned on the shaft 6 and so shaped that the top gripping die 91 is brought into engagement with the upper surface of the blank immediately after the blank has been moved rearward into engagement with the stop 81. Thus the blank is firmly gripped between the said die 91 and the lower part of the stationary die 90.

As a safety means to prevent damage to the machine in case the die meets with any obstruction, we preferably provide a special construction for each of the bearings 94. As illustrated most clearly in Fig. 3, each bearing has a cap 103 which is engaged by a breaker member 104. Extending across the top of the breaker member is a bar 105 which is held in place by means of studs 106, 106 and projecting upward from the main part of the bearing. The breaker member is so designed and proportioned that the legs thereof will spread in case any unusual pressure is applied tending to lift the bearing cap 103. The member 104 will thus break and permit the cap to rise. This permits the entire hub 92, with its arms 95 and 97, to rise thus relieving any undue pressure resulting from an obstruction under the die 91. The members 104, 104 can be easily replaced by other similar members, and thus the machine can be made operative with very little delay and expense.

A side gripping die 107 is provided for engaging the right side of the blank simultaneously with the engagement of the die 91 with the top of the blank. As shown most clearly in Fig. 22, the die 107 is carried by a slide 108 which is longitudinally movable on the guides 109 and 110. The upper part of the slide is enclosed and guided by the frame member 55 which carries the bearings and the transfer rollers. This frame member therefore constitutes a housing and guide for the upper part of the slide. Preferably a gib 55$^a$ is provided which engages the top of the slide, this gib being vertically adjustable to take up wear by means of the screws 55$^b$. The slide 108 is actuated by means of a wedge member 111 which is reciprocated along an inclined guideway 112 formed in the bed and clearly shown in Figs. 9 and 23. It will be seen that the wedge member has cam surfaces 113, 113ª which engage cooperating cam surfaces 114 and 114ª formed on the lower side of the slide 108 to reciprocate it in unison with the reciprocation of the wedge member.

Rotatably mounted in the bed 1 near the rear thereof is a longitudinal shaft 115. This shaft carries a gear 116 which meshes with an idler gear 117 carried by a short jack shaft 118 mounted in bearings 119 and 120 carried by the supports for the main bearings 8 and 9. The idler gear 117 meshes with a gear 121 mounted on the main shaft 6. Through this train of gearing the shaft 118 is rotated continuously when the machine is in operation.

Carried by the shaft 115 is an eccentric 122 which is engaged by a link 123. The front end of the link 123 is pivotally connected with a rocker 124 which is horizontally pivoted at 125. A link 126 is pivotally connected at its rear end to the rocker 124 and is pivotally connected at its front end to the before-mentioned wedge member 111. It will be seen that when the shaft 115 is rotated the wedge member 111 is reciprocated, thus reciprocating the slide 108 as already described. The movements of the parts are so timed that the slide 108 is moved to the left so as to cause the die 107 to engage the side of the blank at the same time that the die 91 engages the top of the blank, thus the blank is firmly held on all four sides.

Preferably the rocker 124 instead of being provided with a fixed pivot at 125 is provided with a movable pivot for a purpose to be described. As illustrated a second rocker 127 is provided which is mounted on a horizontal pivot shaft 128 carried by the bed. The rocker 127 has a downwardly extending lug 129 which is engaged by a horizontal bar 130. Two tension rods 131, 131 extend through the bar 130 and are held at their front ends by means of a bracket 132 projecting downward from the bed. The rear ends of the rods 131 are surrounded by heavy compression coil springs 133, 133. These springs abut against the bar 130 at their front ends and at their rear ends abut against washers 134, 134 which are held in place by means of nuts 135, 135. By means of this mechanism the rocker 127 is normally held in the position shown in Fig. 9. If, however, the side gripping die 107 meets with any obstruction it limits its normal travel. The resistance offered to the movement of the rocker 124 about its pivot at 125 causes the said pivot to move downward, thus forcing the rocker 127 to move in the clockwise direction against the resistance offered by the springs 133, 133. As soon as the obstruction has been removed, which ordinarily would be before the next stroke, the rocker 127 will have been returned to normal position by the springs 133, 133, thus restoring the mechanism to its normal operative position.

The heading mechanism is most clearly shown in Fig. 6, and it comprises a heading die 136 together with suitable operating mechanism therefor. As illustrated the die 136 is carried by an arm 137 which is secured to a horizontal pivot shaft 138. This shaft is mounted in bearings 139 and 140 depending from the bed of the machine as clearly shown in Fig. 2. The main power shaft 6 is provided with a crank 141, and a link 142 fits this crank at one end and at its other end is pivotally connected with the upper end of the arm 137. It will be apparent that the arm 137 is continuously oscillated by the mechanism described thus carrying the die 136 into position to engage the end of a blank gripped by the gripping dies which have been described. The rear ends of the gripping dies are so formed as to determine the shape of the under side of the head, and the die 136 is so formed as to determine the shape of the top of the head. The gripping dies and the heading die thus co-operate to completely form the head. It will be understood that the movement of the heading die is so timed as to bring the die into engagement with the blank immediately after the blank has been gripped by the gripping dies, and after the stop 81 has been moved out of the way.

As soon as the head has been formed on a blank as already described, the several movable dies, that is the dies 91, 107 and 136, move away from the completed spike leaving it supported on the bottom part of the stationary die 90. For removing the finished spike from the stationary die an ejector 143 is provided which is movable longitudinally, being suitably supported and guided as shown. For operating the ejector 143 a lever 144 is provided which is connected with the ejector at 145. The lever 144 has a vertical pivotal mounting on the bed of the machine at 146, and the rear end of the lever is provided with a roller 147 arranged to extend into the groove of a cam 148 mounted on the main shaft 6. The cam 148 is so shaped and so timed as to move the ejector in the operative direction immediately after the spike has been headed, and then released by the several dies. The finished spike falls into a suitable receptacle (not shown) below the machine, and the ejector is immediately withdrawn toward the left so as not to be in the way of the next blank as it is fed rearward.

We claim:

1. In a spike making machine, the combination with heading mechanism; mechanism for feeding and cutting off successive blanks; gripping mechanism for the blanks comprising a fixed die arranged to engage the bottom and one side of each blank; two separately movable dies arranged to respectively engage the top and the other side of the blank; an operating mechanism for moving the side gripping die into and out of operative position; a lever carrying the top gripping die and having two horizontal trunnions on which it is pivoted; means for operating the lever; bearings for the trunnions, comprising caps separable from the main bodies thereof, and yieldable means for holding the caps in normal positions comprising a rigid element spaced from said separable cap and an inverted U shaped element having its base in contact with said rigid element and each of its depending legs in contact with a relatively inclined surface formed on the said separable cap of the bearing, whereby excessive strain applied to the trunnions will cause the legs of the U shaped safety element to yield relative to the base thereof.

2. In a spike making machine, the combination with heading mechanism; mechanism for feeding and cutting off successive blanks; gripping mechanism for the blanks, comprising dies arranged to engage each blank at all four sides thereof; a slide carrying the side gripping die and movable transversely of the blank axis; a guideway for supporting the slide; a housing covering the slide and fitting the upper part thereof; a gib engaging the top of the slide; and means for adjusting the gib.

3. In a spike making machine, the combination with heading mechanism; mechanism for feeding and cutting off successive blanks; gripping mechanism for the blanks comprising dies arranged to engage each blank at all four sides thereof; a slide carrying the side gripping die and movable transversely of the blank axis; and a wedge member movable at an angle to the direction of movement of the slide for operating the said slide.

4. In a spike making machine, the combination with heading mechanism; mechanism for feeding and cutting off successive blanks; gripping mechanism for the blanks comprising dies arranged to engage each blank at all four sides thereof; a slide carrying the side gripping die and movable transversely of the blank axis; and a wedge member for operating the slide, the said wedge member being movable in a plane at right angles to the direction of movement of the slide and along lines inclined upward from the rear toward the front.

5. In a spike making machine, the combination with heading mechanism; mechanism for feeding and cutting off successive blanks; gripping mechanism for the blanks comprising dies arranged to engage each blank at all four sides thereof; a slide carrying the side gripping die and movable transversely of the blank axis; a wedge member movable at an angle to the direction of movement of the slide for operating the said slide; a rotatable eccentric member for operating the wedge member; and connections between the said members including two links and a pivoted rocker element.

6. In a spike making machine, the combination with heading mechanism; mechanism for feeding and cutting off successive blanks; gripping mechanism for the blanks comprising dies arranged to engage each blank at all four sides thereof; a slide carrying the side gripping die and movable transversely of the blank axis; a wedge member movable at an angle of the direction of movement of the slide for operating the said slide; and means for operating the wedge member including an element adapted to yield when an obstruction is encountered by the die.

7. In a spike making machine, the combination with heading mechanism; mechanism for feeding and cutting off successive blanks; gripping mechanism for the blanks comprising dies arranged to engage each blank at all four sides thereof; a slide carrying the side gripping die and movable transversely of the blank axis; a wedge member movable at an angle to the direction of movement of the slide for operating the said slide; and means for operating the wedge member, including a resiliently supported element adapted to yield when an obstruction is encountered by the die and adapted to be returned to normal position when the obstruction is removed.

8. In a spike making machine, the combination with heading mechanism; mechanism for feeding and cutting off successive blanks; gripping mechanism for the blanks comprising dies arranged to engage each blank at all four sides thereof; a slide carrying the side gripping die and movable transversely of the blank axis; a wedge member movable at an angle to the direction of movement of the slide, for operating the said slide; a rotatable eccentric member for operating the wedge member; connections between the said members including two links and a pivoted rocker element; and a yieldable support on which the rocker element is pivoted.

9. In a spike making machine, the combination with heading mechanism; mechanism for feeding and cutting off successive blanks; gripping mechanism for the blanks comprising dies arranged to engage each blank at all four sides thereof; a slide carrying the side gripping die and movable transversely of the blank axis; a wedge member movable at an angle to the direction of movement of the slide for operating the said slide; a rotatable eccentric member for operating the wedge member; connections between the said members including two links and a pivoted rocker element; a movable member on which the said rocker element is pivoted; and spring means for holding the said movable member in normal position.

10. In a spike making machine, the combination with heading mechanism; mechanism for feeding and cutting off successive blanks; gripping mechanism for the blanks comprising dies arranged to engage each blank at all four sides thereof; a slide carrying the side gripping die and movable transversely of the blank axis; a wedge member movable at an angle to the direction of movement of the slide for operating the said slide; a rotatable eccentric member for operating the wedge member; connections between the said members including two links and a pivoted rocker element; a second pivoted rocker element on which the first rocker element is pivoted; and spring means for holding the second rocker element in normal position.

CHARLES A. DONLEY.
WM. ETTER.